United States Patent
Mishra et al.

(10) Patent No.: US 9,449,127 B1
(45) Date of Patent: Sep. 20, 2016

(54) SYSTEM FOR VERIFYING TIMING CONSTRAINTS OF IC DESIGN

(71) Applicants: Ateet Mishra, Delhi (IN); Shiva Belwal, Nainital (IN); Deepak Mahajan, Noida (IN)

(72) Inventors: Ateet Mishra, Delhi (IN); Shiva Belwal, Nainital (IN); Deepak Mahajan, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 78 days.

(21) Appl. No.: 14/675,752

(22) Filed: Apr. 1, 2015

(51) Int. Cl.
*G06F 9/45* (2006.01)
*G06F 17/50* (2006.01)

(52) U.S. Cl.
CPC ......... *G06F 17/5031* (2013.01); *G06F 17/505* (2013.01); *G06F 17/5081* (2013.01)

(58) Field of Classification Search
CPC ....................................................... G06F 9/45
USPC ............................................................ 716/103
See application file for complete search history.

(56) References Cited

U.S. PATENT DOCUMENTS

| | | |
|---|---|---|
| 7,650,581 B2 | 1/2010 | Rahim et al. |
| 7,941,774 B2 | 5/2011 | Luan et al. |
| 2010/0050139 A1* | 2/2010 | Abadir ............... G06F 17/5045 716/106 |

OTHER PUBLICATIONS

Khandelwal, Ankit; Gaur, Abhinav; Mahajan, Deepak; "Gate level simulation: verification flow and challenges", EDN Network, Mar. 5, 2014.
Goering, Richard; "Functional Verification Survey—Why Gate-Level Simulation is Increasing," Cadence, http://community.cadence.com/cadence_blogs_8/b/ii/archive/2013/01/16/functional-verification-survey-why-gate-level-simulation-is-increasing, Jan. 16, 2013.
Goering, Richard; "Whitepaper Review: Improving Gate-Level Simulation Performance," Cadence, http://community.cadence.com/cadence_blogs_8/b/ii/archive/2013/02/18/whitepaper-review-improving-gate-level-simulation-performance, Feb. 18, 2013.
Jalan, Gaurav; "Gate Level Simulations: A Necessary Evil—Part 2", Siddhakarana blog, http://whatisverification.blogspot.in/2011/06/gate-level-simulations-necessary-evil_29.html, Jun. 29, 2011.
Anon; "Gate level simulation—Introduction," The Digital Electronics Blog, http://blog.digitalelectronics.co.in/2006/10/gate-level-simulation-introduction.html, Oct. 16, 2006.

* cited by examiner

*Primary Examiner* — Thuan Do
(74) *Attorney, Agent, or Firm* — Charles E. Bergere

(57) ABSTRACT

An EDA tool for verifying timing constraints of an integrated circuit (IC) design includes a processor and a memory that stores register transfer level (RTL) code of the IC design and a timing constraint file. The processor generates a netlist based on the RTL code, and identifies asynchronous clock paths, false paths and multi-cycle paths in the netlist using the timing constraint file. The processor then inserts buffer cells for logic cells in the netlist. The processor also inserts buffer cells in the asynchronous clock paths, false paths, and multi-cycle paths. The processor delay annotates logic cells and clock delay cells with a zero delay value and the buffer cells with known delay values. The processor generates a modeled standard delay format (SDF) file and performs a gate level simulation (GLS) using the modeled SDF file.

20 Claims, 8 Drawing Sheets

SYSTEM FOR VERIFYING TIMING CONSTRAINTS OF IC DESIGN

BACKGROUND OF THE INVENTION

The present invention generally relates to electronic design automation (EDA) tools, and more particularly to an EDA tool for verifying timing constraints of an integrated circuit (IC) design.

Integrated circuits (ICs) including system-on-chips (SoCs) integrate various digital and sometimes analog elements on a single chip. With advancements in semiconductor technology, the operational speed of ICs is increasing and more and more functions are being added to the ICs by increasing the number of circuit elements. This has led to an increase in the complexity of the ICs, thereby leading to a decrease in the yield of the ICs. Thus, testing and verifying a design during the design stage has become increasingly important.

Testing and verification are performed by an EDA tool. In the front-end design stage, the operation of the IC design is described using a hardware description language (HDL) such as Verilog and very high speed integrated circuit (VHSIC) hardware description language (VHDL), and a register transfer level (RTL) file or RTL code is generated that is representative of the IC design. The RTL code is synthesized by the EDA tool to generate a corresponding gate level netlist that is indicative of the IC design and describes the operation of the IC design at the gate level using circuit elements such as logic cells, buffer cells, and clock delay cells from a technology library and interconnections among the circuit elements.

After generation of the netlist, placement, clock tree synthesis, and routing operations are performed. Placement is the process of assigning non-overlapping areas of the netlist to the circuit elements to reduce the area and power requirements of the netlist. Usually the circuit elements that frequently communicate with each other are placed in close proximity in order to reduce the delay of signals and power required during signal transmission.

Clock tree synthesis is the process of inserting clock delay cells in the netlist for meeting clock skew, area, and power constraints. Routing is the process of connecting the circuit elements of the netlist. A delay calculator calculates the delay of signal paths based on a timing library. The signal paths include both clock and data paths. The timing library includes information such as circuit element delay values, interconnecting wires delay values (net delays), and circuit element setup and hold times. Typically, the delay values of the circuit elements and the net delays are estimated delay values.

The netlist also includes non-critical signal paths, which are signal paths that generally are well within timing parameters. Examples of such signal paths include false paths, multi-cycle paths, and signal paths that include circuit elements for receiving asynchronous clock signals, i.e., a signal path between asynchronous clock paths. An example of a false path is a signal path in which changes in an input signal to a source circuit element of the signal path do not affect an output signal of a destination circuit element of the signal path. A multi-cycle path is a signal path that requires more than one clock cycle for transmission of a signal therethrough. A signal path between asynchronous clock paths is a non-critical path because the netlist includes a synchronizer for synchronizing the operations of the circuit elements of the signal path. If data regarding the non-critical signal paths is not provided to the EDA tool for performing a static timing analysis (STA) of the netlist, the EDA tool analyzes the non-critical paths, which increases the time required for verifying the IC design.

During the design stage, designers provide timing constraints required to test the netlist by way of a timing constraint file. The timing constraints corresponding to false paths, multi-cycle paths, and signal paths between asynchronous clock paths are known as false path constraints, multi-cycle path constraints, and asynchronous clock path constraints, respectively. The timing constraint file includes information indicative of the timing constraints such as asynchronous clock, false path, and multi-cycle path constraints. A standard delay format (SDF) file is generated based on a timing constraint file and the delay information using the EDA tool. The SDF file includes timing information such as the delay values of the circuit elements, the net delays, the timing constraints, the setup and hold times of the circuit elements, and the delay values of the signal paths. The SDF file also includes timing information that describes minimum, typical, and maximum delay values of the circuit elements and the interconnecting wires.

Gate level simulation (GLS) is performed by the EDA tool for determining whether the netlist meets the timing requirements based on the SDF file. Based on the GLS, the different steps of the IC design process may be re-performed to meet various requirements such as area, timing, and power requirements.

As the delay values of the circuit elements and the net delays are estimated values, the delay values of the signal paths calculated by the delay calculator also are estimated values. Only one delay value among minimum, typical, and maximum delay values for each circuit element and each interconnecting wire can be used for the GLS, which restricts the use of GLS to limited delay values or delay configurations.

Further, ICs experience on-chip variations, which are introduced due to process, voltage, and temperature variations. Examples of process variations include variation in doping level of a substrate, variation in the length and widths of the circuit elements and the interconnecting wires, and clock crosstalk. Due to the on-chip variations, the delay values of the circuit elements and the interconnecting wires vary. The SDF file does not include timing margins in the delay values of the circuit elements and interconnecting wires. As timing constraints in the timing constraint file are provided by the IC designer, some of the timing constraints may not be valid. Further, GLS is pattern dependent and hence, a transition in a signal may not lie within a setup and hold time margin (hereinafter referred to as "setup and hold time window") around a clock edge of a clock signal. Thus, a critical signal path propagating the signal may not be verified correctly using the GLS and hence, the timing constraints in the timing constraint file may not be verified. Therefore, the GLS does not ensure that the IC will operate at its desired clock frequency.

STA is performed by the EDA tool for a detailed timing analysis to determine whether the netlist meets the timing requirements based on the SDF. The STA is a topographical analysis of the netlist and does not consider the functionality of the circuit elements and hence depends on the SDF for timing constraints. Thus, in STA, signal paths corresponding to the timing constraints are not analyzed and hence, signal paths corresponding to invalid timing constraints are not verified. Further, STA considers on-chip variations by applying de-rating factors to the signal paths. Thus, a signal path that was validated during GLS may violate setup and hold times in STA and be identified as a critical path.

Signal paths identified as critical paths during STA are analyzed to identify the validity of the identified critical paths, which is time consuming. If the netlist does not meet the timing requirements, the steps of the IC design process are re-performed. Thus, the whole process consumes many engineering hours. Thus, it is very beneficial to verify the timing constraint file at an early stage and also to generate an SDF file that includes on-chip violation delay information.

One known technique to hasten the GLS is to generate a partial timing model of the IC design. The partial timing model includes timing information of the circuit elements of the IC design some, but not all, signal paths in the IC design, and the other circuit elements of the netlist are delay annotated with a zero delay value. The EDA tool performs the GLS using the partial timing model. Although this technique helps in reducing the time required for performing GLS, it fails to perform a complete verification of the timing constraints for the IC design.

Therefore, it would be advantageous to have a system and method that verifies timing constraints of an IC design represented by a netlist at a very early stage of the IC design.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
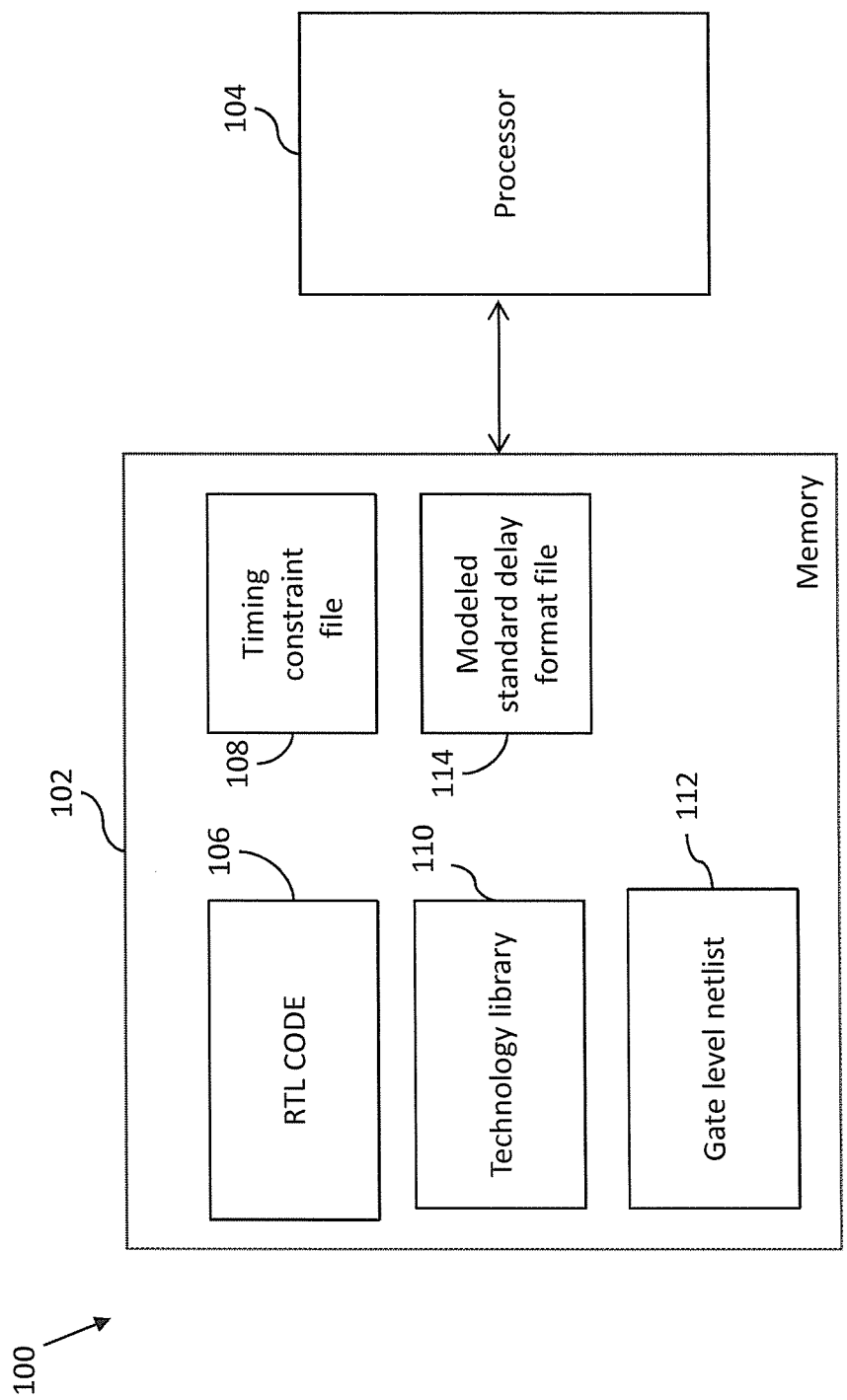
FIG. 1 is a schematic block diagram of an EDA tool for verifying timing constraints of a netlist that is indicative of an integrated circuit design in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the term multiplexer has been abbreviated as a mux and the term de-multiplexer has been abbreviated as a demux.

In an embodiment of the present invention, an electronic design automation (EDA) tool for verifying timing constraints of a netlist that is indicative of an integrated circuit (IC) design is provided. The EDA tool includes a memory and a processor in communication with the memory. The memory stores a register transfer level (RTL) code of the IC design and a timing constraint file. The timing constraint file includes asynchronous clock, false path, and multi-cycle path constraints. The processor generates the netlist based on the RTL code. The netlist includes a plurality of logic cells and a plurality of clock delay cells that form a plurality of clock paths, a plurality of false paths, and a plurality of multi-cycle paths. The processor receives the timing constraint file from the memory. The processor inserts a plurality of buffer cells in the netlist. The processor inserts at least one first buffer cell of the plurality of buffer cells for each logic cell of the plurality of logic cells in the netlist. The at least one first buffer cell and corresponding logic cell form a two-stage logic cell. The processor identifies at least one clock path of the plurality of clock paths based on the asynchronous clock constraints and inserts at least one second buffer cell into the at least one clock path. The processor identifies at least one false path of the plurality of false paths based on the false path constraints. The processor inserts at least one third buffer cell into the at least one false path. The processor identifies at least one multi-cycle path of the plurality of multi-cycle paths based on the multi-cycle path constraints. The processor inserts at least one fourth buffer cell into the at least one multi-cycle path. The processor delay annotates the plurality of logic cells and the plurality of clock delay cells with a zero delay value. The processor delay annotates the first, second, third, and fourth buffer cells with first, second, third, and fourth delay values, respectively. The processor generates a modeled SDF file. The processor stores the modeled standard delay format file in the memory. The processor performs a GLS using the modeled SDF file for verifying the asynchronous clock, false path, and multi-cycle path constraints.

In another embodiment, the present invention provides a method for verifying timing constraints of a netlist that is indicative of an IC design using an EDA tool. The EDA tool includes a memory and a processor in communication with the memory. The memory stores register transfer level (RTL) code of the IC design and a timing constraint file. The timing constraint file includes asynchronous clock, false path, and multi-cycle path constraints. The netlist is generated based on the RTL code. The netlist includes a plurality of logic cells and a plurality of clock delay cells that form a plurality of clock paths, a plurality of false paths, and a plurality of multi-cycle paths. The timing constraint file is received by the processor from the memory. A plurality of buffer cells is inserted in the netlist. At least one first buffer cell of the plurality of buffer cells is inserted into the netlist for each logic cell of the plurality of logic cells. The at least one first buffer cell and corresponding logic cell form a two-stage logic cell. At least one clock path of the plurality of clock paths is identified based on the asynchronous clock constraints and at least one second buffer cell is inserted into the at least one clock path. At least one false path of the plurality of false paths is identified based on the false path constraints and at least one third buffer cell is inserted into the at least one false path. At least one multi-cycle path of the plurality of multi-cycle paths is identified based on the multi-cycle path constraints and at least one fourth buffer cell is inserted into the at least one multi-cycle path. The logic cells and the clock delay cells are delay annotated with a zero delay value, while the first, second, third, and fourth buffer cells are delay annotated with respective first, second, third, and fourth delay values. A modeled SDF file is generated and stored in the memory. Then GLS is performed using the modeled SDF file for verifying the asynchronous clock, false path, and multi-cycle path constraints.

Various embodiments of the present invention provide a system and method for verifying timing constraints of a netlist that is indicative of an IC design using an EDA tool. The EDA tool includes a memory for storing RTL code of the IC design and a timing constraint file. The EDA tool further includes a processor in communication with the memory. The processor generates a netlist based on the RTL code. The netlist includes a plurality of logic cells and a plurality of clock delay cells. The processor inserts a first buffer cell for each respective logic cell in the netlist. The processor identifies at least one clock path of a plurality of clock paths, at least one false path of a plurality of false paths, and at least one multi-cycle path of a plurality of multi-cycle paths based on the timing constraints and inserts at least one second, at least one third, and at least one fourth buffer cell into the at least one clock path, the at least one false path, and the at least one multi-cycle path, respectively. The processor delay annotates the clock delay cells and the logic cells with a zero delay value, and delay annotates the at least one first, the at least one second, the at least one third, and the at least one fourth buffer cells with respective first, second, third, and fourth delay values. The processor generates a modeled SDF file and performs GLS based on the modeled SDF file for verifying the timing constraints.

Based on the GLS, the processor updates the modeled SDF file if the timing constraints are not valid and stores the updated SDF file. The processor generates the modeled SDF file such that delay information of circuit elements such as the logic cells, the clock delay cells, and buffer cells of the netlist include timing margins in the delay values of the circuit elements and interconnecting wires. The timing margins that account for on-chip variations. The delay information may include delay values of the circuit elements, delay values of the interconnecting wires (hereinafter referred to as "net delays"), and setup and hold times of the circuit elements. As the delay information includes timing margins, the time required for designing an IC, i.e., the design cycle time is reduced. Further, during GLS, invalid timing constraints are identified and the modeled SDF file is updated.

Referring now to FIG. 1, an electronic design automation (EDA) tool 100 in accordance with an embodiment of the present invention is shown. The EDA tool 100 includes a memory 102 and a processor 104 in communication with the memory 102. The memory 102 receives and stores a RTL file or RTL code 106 of the IC design and a timing constraint file 108. The RTL code 106 may include RTL code of an IC design that includes digital logic elements, digital memory elements, or a combination thereof. Examples of digital logic elements include an AND gate, an OR gate, a NOT gate, a NOR gate, a NAND gate, an XOR gate, an XNOR gate, and/or a combinational logic circuit that includes a combination of the above-mentioned gates. Examples of digital memory elements include a flip-flop, a latch, a shift-register, a multiplexer (hereinafter referred to as mux), and a demultiplexer (hereinafter referred to as demux). The timing constraint file 108 includes timing constraints such as asynchronous clock, false path, and multi-cycle path constraints. The timing constraints of the timing constraint file 108 may be provided by an IC designer.

The memory 102 also is used to store a technology library 110. The technology library 110 comprises instances of the digital memory elements and digital logic elements.

The processor 104 and the memory 102 comprise a computer system that can range from a stand-alone personal computer to a network of processors and memories, to a mainframe system. The computer system must be able to run verification tools that can simulate digital and analog circuits, such as Incisive™ Unified Simulator (IUS) by Cadence Design Systems, Inc. Such tools and computer systems are known to those of skill in the art. Examples of the IC design include microprocessor, microcontroller unit (MCU), system-on-chip (SoC), and application specific IC (ASIC) designs.

The processor 104 reads the RTL code 106 from the memory 102 and generates a corresponding gate level netlist 112. The netlist 112 includes a plurality of logic cells, interconnecting wires, and a plurality of clock delay cells that form a plurality of clock paths, a plurality of false paths, and a plurality of multi-cycle paths. Examples of a logic cell include a flip-flop, a latch, an AND gate, an OR gate, a NOR gate, a NAND gate, an XOR gate, an XNOR gate, a NOT gate, or a combination thereof.

The processor 104 identifies the logic cells and inserts a plurality of buffer cells into the netlist 112. In one embodiment, the processor 104 inserts a buffer cell at each output terminal of each of the logic cells, thereby modifying the logic cells to generate corresponding two-stage logic cells. In another embodiment, the processor 104 inserts a buffer cell at each input terminal of each of the logic cells, which also forms two-stage logic cells.

The processor 104 identifies one or more clock paths of the clock paths in the netlist 112 based on the corresponding asynchronous clock constraints. Subsequently, the processor 104 inserts a first buffer cell in at least one clock path of the identified clock paths. In one embodiment, the processor 104 inserts a first buffer cell in each identified clock path. However, the delay values for each of the first buffer cells may be different.

The processor 104 identifies a false path of the false paths in the netlist 112 based on the corresponding false path constraint. Subsequently, the processor 104 inserts a second buffer cell in the identified false path. In one embodiment, the processor 104 inserts a second buffer cell into each identified false path. However, the delay values for each of the second buffer cells may be different.

The processor 104 further identifies a multi-cycle path of the multi-cycle paths in the netlist 112 based on the corresponding asynchronous multi-cycle path constraint. Subsequently, the processor 104 inserts a third buffer cell into the identified multi-cycle path. In one embodiment, the processor 104 inserts a third buffer cell into each identified multi-cycle path. However, the delay values for each of the third buffer cell may be different.

The processor 104 delay annotates the logic cells and the clock delay cells with a zero delay value. Thus, the logic cells of the two-stage logic cells only represent the functionality executed by the logic cells while transmitting signals. The buffer cells of the two-stage logic cells only represent the delay introduced by the logic cells in the signals while transmitting the signals through corresponding two-stage logic cells. The processor 104 may further delay annotate the interconnecting wires (not shown) of the netlist 112 with the zero delay value, thereby reducing net delays to zero. The processor 104 delay annotates the plurality of buffer cells with corresponding delay values. The delay values describe delays introduced by corresponding buffer cells in transmitting a signal therethrough. In one embodiment, the delay values are provided by the IC designer.

The processor 104 delay annotates the first, second, and third buffer cells with first, second, and third delay values, respectively. The first, second, and third delay values are selected such that any invalid timing constraint in the timing constraint file 108 will be identified during a gate level simulation (GLS). In one embodiment, the first delay value describes delay introduced in propagating a signal through a signal path between clock paths corresponding to the asynchronous clock path constraint. The second delay value represents delay introduced in propagating a signal through a signal path corresponding to the false path constraint. The third delay value represents the delay introduced in transmitting a signal thorough a signal path corresponding to the multi-cycle path constraint. In another embodiment, the first, second, and third delay values are substantially equal to a time period corresponding to first, second, and third design frequencies, respectively, of the IC design. The first, second, and third design frequencies lie in an operating frequency range of the IC design. In one embodiment, the second design frequency is the lowest design frequency of the operating frequency range for identifying the validity of the false path constraint. In another embodiment, the second design frequency is swept over the operating frequency range from the maximum frequency to the lowest frequency of the operating frequency range to ensure the validity of the false path constraint.

It will be understood by those of skill in the art that one or more buffer cells can be inserted in a signal path. The processor 104 delay annotates the one or more buffer cells such that the delay values of the one or more buffer cells inserted in the signal path equals the delay in transmitting a signal through the signal path.

Subsequent to insertion of the buffer cells and delay annotation, the processor 104 generates a modeled standard delay format (SDF) file 114. The modeled SDF file 114 includes delay values of the logic cells, the delay values of the plurality of buffer cells, and the delay values of the first, second, and third buffer cells. The modeled SDF file 114 further includes information indicative of the timing constraints. The modeled SDF file 114 further includes delay values of the signal paths of the netlist 112 and setup and hold times of flip-flops of the netlist 112. In one embodiment, the signal path delay values are calculated by the processor 104 using a timing library (not shown) stored in the memory 102.

The processor 104 inserts the plurality of buffer cells, the first buffer cell, the second buffer cell, and the third buffer cell into the netlist 112. It will be understood by those of skill in the art that the processor 104 modifies the netlist 112 for inserting the plurality of buffer cells, the first buffer cell, the second buffer cell, and the third buffer cell in the netlist 112. It will be further understood by those of skill in the art that the processor 104 may store a modified netlist and perform operations on the modified netlist.

Subsequently, the processor 104 performs GLS using the modeled SDF file 114. The processor 104 applies input vectors to the netlist 112. Frequencies of each clock signal in the netlist 112 are varied over the operating frequency range. The operating frequency range includes design frequencies over which the IC design is intended to operate and includes minimum and maximum design frequencies.

If the asynchronous clock constraint is invalid, a transition of a signal in a signal path between corresponding clock paths lies in a setup and hold time window around a clock edge and hence, the processor 104 identifies the asynchronous clock constraint as invalid. If the asynchronous clock constraint is valid, delay annotating the first buffer cell with the first delay value does not affect the functioning of the netlist 112. Thus, the time spent in detecting the presence of a synchronizer to mitigate setup and hold violations due to asynchronous clock paths may be reduced, i.e., there is no necessity of detecting the presence of synchronizers in the RTL code 106 or the netlist 112. Thus, the processor 104 correctly identifies the invalid asynchronous clock constraints.

If the false path constraint is invalid, a transition in a signal in corresponding false path, i.e., the false path corresponding to the invalid false path constraint lies in a setup and hold time window around a clock edge, thereby resulting in timing violations. If the false path constraint is valid, delay annotating the second buffer cell with the second delay value does not have any effect on the functioning of the netlist 112. Thus, the processor 104 identifies the invalid false path constraints.

If the multi-cycle path constraint is invalid, a transition in an output signal of corresponding multi-cycle path occurs in a time period that is substantially equal to a time period of a clock signal and lies in a setup and hold time window around a clock edge. The clock signal has a frequency in the operating frequency range. If the multi-cycle path constraint is invalid, delay annotating the third buffer cell with the third delay value does not have any effect on the functioning of the netlist 112. Thus, the processor 104 identifies the invalid multi-cycle path constraints.

Figure 2B:
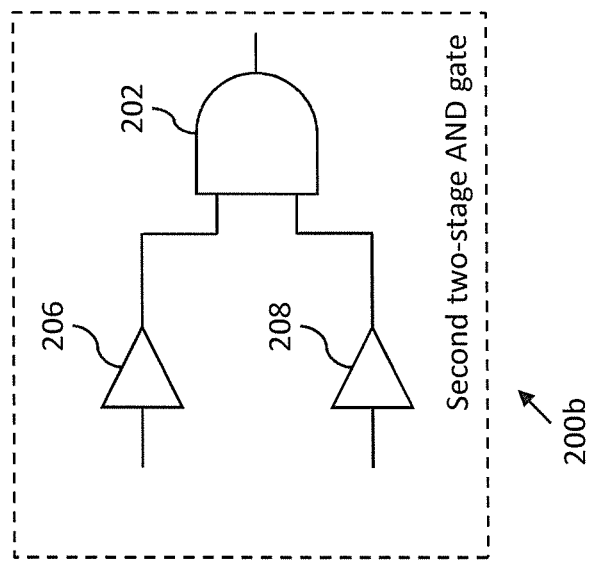
FIG. 2B is a schematic block diagram of a second two-stage AND gate in accordance with an embodiment of the present invention.
Figure 2A:
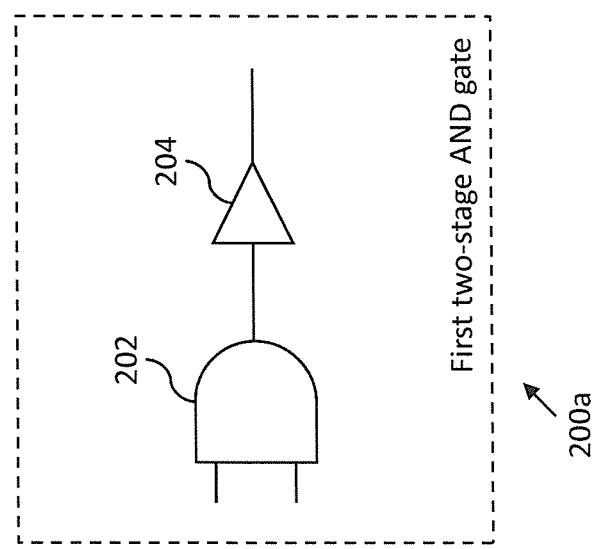
FIG. 2A is a schematic block diagram of a first two-stage AND gate in accordance with an embodiment of the present invention.

FIG. 2A illustrates a first two-stage AND gate 200a in accordance with one embodiment of the present invention. The first two-stage AND gate 200a includes a first AND gate 202 and a fourth buffer cell 204. The fourth buffer cell 204 is inserted by the processor 104 at an output terminal of the first AND gate 202, i.e., the fourth buffer cell 204 is inserted by the processor 104 such that an input terminal of the fourth buffer cell 204 is connected to the output terminal of the first AND gate 202.

FIG. 2B illustrates a second two-stage AND gate 200b in accordance with another embodiment of the present invention. The second two-stage AND gate 200b includes the first AND gate 202 and fifth and sixth buffer cells 206 and 208. The fifth buffer cell 206 is inserted by the processor 104 at a first input terminal of the first AND gate 202, i.e., the fifth buffer cell 206 is inserted by the processor 104 such that an output terminal of the fifth buffer cell 206 is connected to the first input terminal of the first AND gate 202. The sixth buffer cell 208 is inserted by the processor 104 at a second input terminal of the first AND gate 202, i.e., the sixth buffer cell 208 is inserted by the processor 104 such that an output terminal of the sixth buffer cell 208 is connected to the second input terminal of the first AND gate 202. The second two-stage AND gate 200b is functionally similar to the first two-stage AND gate 200a. Thus, the processor 104 inserts buffer cells at either input or output terminals of the logic cells, thereby modifying the logic cells to generate corresponding two-stage logic cells.

Figure 3A:
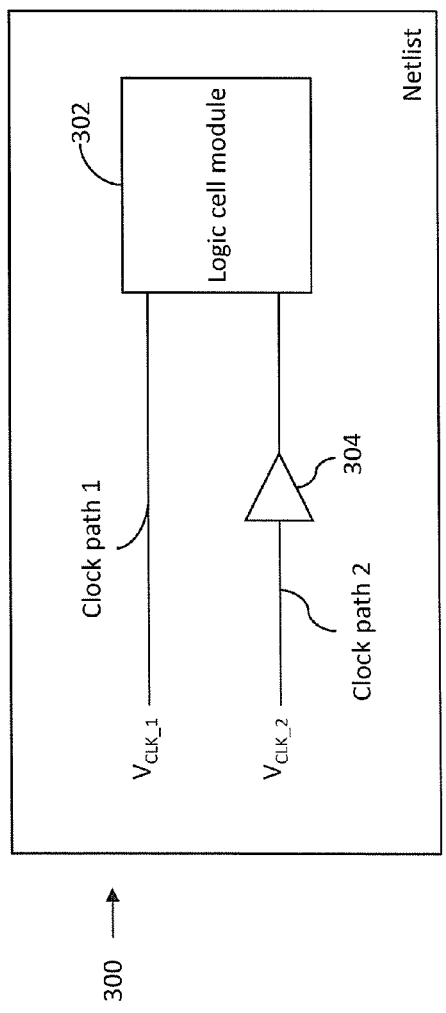
FIGS. 3A, 3B, and 3C are schematic block diagrams of multiple signal paths in a gate level netlist in accordance with an embodiment of the present invention.
Figure 3B:
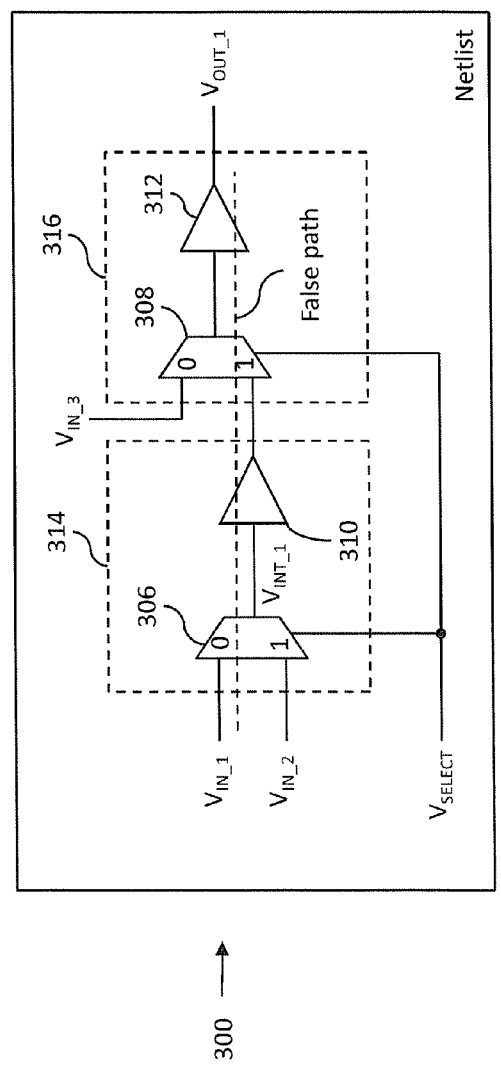
Figure 3C:
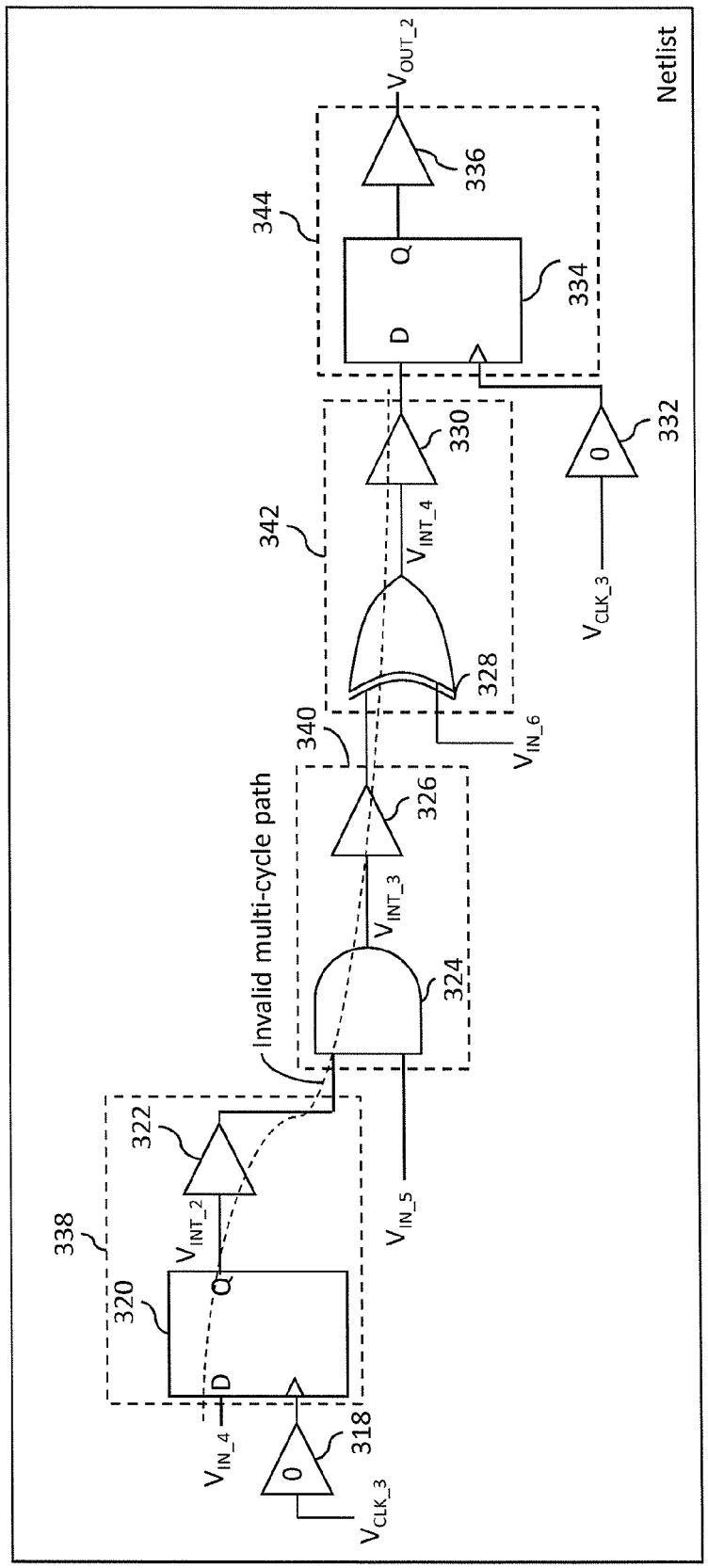

FIGS. 3A, 3B, and 3C illustrate schematic block diagrams of multiple signal paths in a gate level netlist 300 in accordance with embodiments of the present invention.

In FIG. 3A, the netlist 300 includes first and second clock paths and a logic cell module 302 that receives first and second clock signals ($V_{CLK\_1}$ and $V_{CLK\_2}$). The logic module cell 302 may include one or more logic cells. The first and second clock paths are identified by the processor 104 based on an asynchronous clock constraint that is included in the timing constraint file 108. The first and second clock signals are generated from the same source and hence, the logic module cell 302 does not include any synchronizer to synchronize operations of circuit elements of the signal path between the first and second clock paths. A seventh buffer cell 304 is inserted by the processor 104 in the second clock path. The seventh buffer cell 304 skews the second clock path with respect to the first clock path.

In FIG. 3B, the netlist 300 includes first and second muxes 306 and 308 and eighth and ninth buffer cells 310 and 312. The first mux 306 has first and second input terminals for receiving first and second input signals ($V_{IN\_1}$ and $V_{IN\_2}$), respectively, a select terminal for receiving a select signal ($V_{SELECT}$) and an output terminal for outputting a first intermediate signal ($V_{INT\_1}$).

The eighth buffer cell 310 has an input terminal connected to the output terminal for receiving the first intermediate signal ($V_{INT\_1}$) and an output terminal for outputting a buffered first intermediate signal ($V_{BUF\_INT\_1}$). The eighth buffer cell 310 is inserted by the processor 104 at the output terminal of the first mux 306. The first mux 306 and the eighth buffer cell 310 form a two-stage first mux 314.

The second mux 308 has a first input terminal for receiving a third input signal ($V_{IN\_3}$) and a second input terminal connected to the output terminal of the eighth buffer cell 310 the for receiving the buffered first intermediate signal ($V_{BUF\_INT\_1}$). The second mux 308 has a select terminal for receiving the select signal ($V_{SELECT}$) and an output terminal for outputting a first output signal ($V_{OUT\_1}$).

The ninth buffer cell 312 has an input terminal connected to the output terminal of the second mux 308 for receiving the first output signal ($V_{OUT\_1}$) and an output terminal for outputting a buffered first output signal ($V_{BUF\_OUT\_1}$). The ninth buffer cell 312 is inserted by the processor 104 at the output terminal of the second mux 308. The second mux 308 and the ninth buffer cell 312 form a two-stage second mux 316.

In one embodiment, the first input signal ($V_{IN\_1}$) is generated by a source flip-flop (not shown) and the buffered first output signal ($V_{BUF\_INT\_1}$) is received by a destination flip-flop (not shown).

When the select signal ($V_{SELECT}$) is logic low, the first mux 306 outputs the first input signal ($V_{IN\_1}$) as the first intermediate signal ($V_{INT\_1}$). The eighth buffer cell 310 outputs the first input signal ($V_{IN\_1}$) as the buffered first intermediate signal ($V_{BUF\_INT\_1}$). However, the second mux 308 does not output the first input signal ($V_{IN\_1}$) as the first output signal ($V_{OUT\_1}$). The select signal ($V_{SELECT}$) has to be logic low for the second mux 308 to output the first input signal ($V_{IN\_1}$) as the first output signal ($V_{OUT\_1}$). This is a contradiction and hence, the signal path from the first input terminal of the first mux 306 to the output terminal of the second mux 308 is a false path.

In FIG. 3C, the netlist 300 includes a first clock delay cell 318, a first flip-flop 320, a tenth buffer cell 322, a second AND gate 324, a eleventh buffer cell 326, an XOR gate 328, a twelfth buffer cell 330, a second clock delay cell 332, a second flip-flop 334, and a thirteenth buffer cell 336.

The first flip-flop 320 has an input terminal for receiving a fourth input signal ($V_{IN\_4}$), a clock terminal for receiving a third clock signal ($V_{CLK\_3}$) by way of the first clock delay cell 318, and an output terminal for outputting a second intermediate signal ($V_{INT\_2}$).

The tenth buffer cell 322 has an input terminal connected to the output terminal of the first flip-flop 320 for receiving the second intermediate signal ($V_{INT\_2}$) and an output terminal for outputting a buffered second intermediate signal ($V_{BUF\_INT\_2}$). The tenth buffer cell 322 is inserted by the processor 104 at the output terminal of the first flip-flop 320. The first flip-flop 320 and the tenth buffer cell 322 form a two-stage first flip-flop 338.

The second AND gate 324 has a first input terminal connected to the output terminal of the tenth buffer cell 322 for receiving the buffered second intermediate signal ($V_{BUF\_INT\_2}$) and a second input terminal for receiving a fifth input signal ($V_{IN\_5}$). The second AND gate 324 has an output terminal for outputting a third intermediate signal ($V_{INT\_3}$).

The eleventh buffer cell 326 has an input terminal connected to the output terminal of the second AND gate 324 for receiving the third intermediate signal ($V_{INT\_3}$) and an output terminal for outputting a buffered third intermediate signal ($V_{BUF\_INT\_3}$). The eleventh buffer cell 326 is inserted by the processor 104 at the output terminal of the second AND gate 324. The second AND gate 324 and the eleventh buffer cell 326 form a third two-stage AND gate 340.

The XOR gate 328 has a first input terminal connected to the output terminal of the eleventh buffer cell 326 for receiving the buffered third intermediate signal $V_{BUF\_INT\_3}$) and a second input terminal for receiving a sixth input signal ($V_{IN\_6}$). The XOR gate 328 has an output terminal for outputting a fourth intermediate signal ($V_{INT\_4}$).

The twelfth buffer cell 330 has an input terminal connected to the output terminal of the XOR gate 328 for receiving the fourth intermediate signal ($V_{INT\_4}$) and an output terminal for outputting a buffered fourth intermediate signal ($V_{BUF\_INT\_4}$). The twelfth buffer cell 330 is inserted by the processor 104 at the output terminal of the XOR gate 328. The XOR gate 328 and the twelfth buffer cell 330 form a two-stage XOR gate 342.

The second flip-flop 334 has an input terminal connected to the output terminal of the twelfth buffer cell 330 for receiving the buffered fourth intermediate signal ($V_{BUF\_INT\_4}$) and a clock terminal for receiving the third clock signal ($V_{CLK\_3}$) by way of the second clock delay cell 332. The second flip-flop 334 has an output terminal for outputting a second output signal ($V_{OUT\_2}$).

The thirteenth buffer cell 336 has an input terminal connected to the output terminal of the second flip-flop 334 for receiving the second output signal ($V_{INT\_2}$) and an output terminal for outputting a buffered second output signal ($V_{BUF\_OUT\_2}$). The thirteenth buffer cell 336 is inserted by the processor 104 at the output terminal of the second flip-flop 334. The second flip-flop 334 and the thirteenth buffer cell 336 form a two-stage second flip-flop 344.

In the example, the netlist 300 is operated at a design frequency of 3.2 Megahertz (MHz). The delay values of the first mux 306, the second mux 308, the first flip-flop 320, the second AND gate 324, the XOR gate 328, and the second flip-flop 334 are 11 nanosecond (ns), 11 ns, 4 ns, 3 ns, 3 ns, and 4 ns, respectively. The setup and hold times of the second flip-flop 334 are 2 nanoseconds. The estimated variation in delay value of the signal path from the first input terminal of the first mux 306 to an output terminal of the ninth buffer cell 312 due to on chip variation is 290 ns. The estimated variation due to on chip variations in delay value of the signal path from the input terminal of the first flip-flop 320 to the output terminal of the twelfth buffer cell 330 is 300 ns.

In one embodiment, the processor 104 delay annotates the first and second clock delay cells 318 and 322 with the zero delay value. The processor 104 delay annotates the first mux 306, the second mux 308, the first flip-flop 320, the second AND gate 324, the XOR gate 328, and the second flip-flop 334 each with the zero delay value. The processor 104 delay annotates the interconnecting wires in the netlist 300 with the zero delay value.

The processor 104 delay annotates the seventh buffer cell 304 with a delay value of 10 ns. The processor 104 delay annotates the eighth buffer cell 310, the ninth buffer cell 312, the tenth buffer cell 322, the eleventh buffer cell 326, the twelfth buffer cell 330, and the thirteenth buffer cell 336 with delay values of 156 ns, 156 ns, 104 ns, 104 ns, and 104 ns, respectively. Hence, timing margins in the delay values of the eighth buffer cell 310, the ninth buffer cell 312, the tenth buffer cell 322, the eleventh buffer cell 326, the twelfth buffer cell 330, and the thirteenth buffer cell 336 are set by the processor 104 by considering the effects of on-chip variations on the operation of the netlist 300.

The delay value of the seventh buffer cell 304 is such that a transition in a signal in the signal path between the first and second clock signals ($V_{CLK\_1}$ and $V_{CLK\_2}$) lies in the setup and hold time window around a clock edge of the second clock signal ($V_{CLK\_2}$). Thus, the processor 104 identifies corresponding asynchronous clock constraint as invalid.

As the netlist 300 of FIG. 3B includes a valid false path, the false path cannot be sensitized and hence, the first output signal ($V_{OUT\_1}$) is stable even when the first input signal ($V_{IN\_1}$) undergoes a transition. Thus, the false path does not cause any timing violation and the processor 104 identifies corresponding false path constraint as valid.

Figure 4:
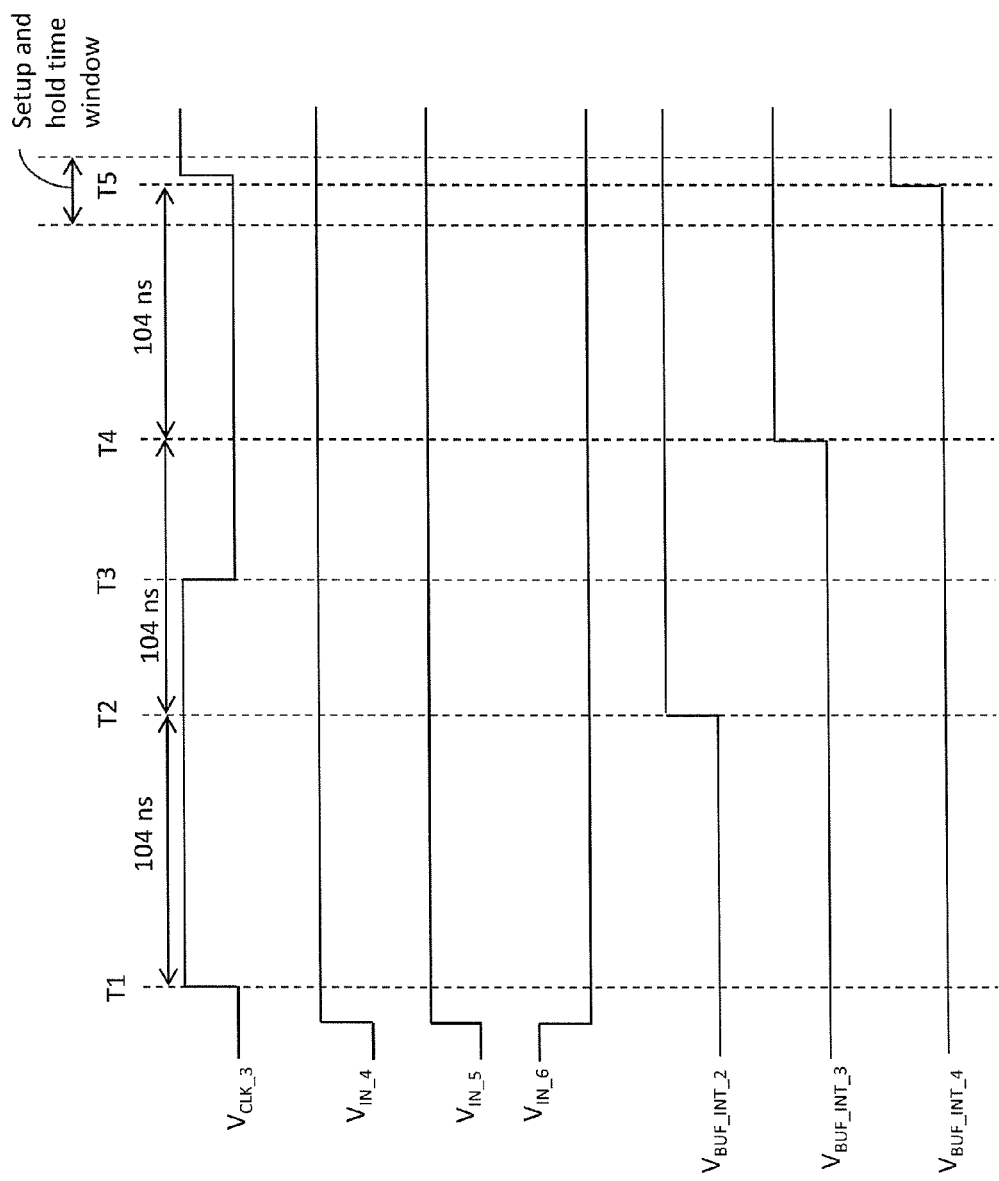
FIG. 4 is a timing diagram illustrating an operation of a signal path of the multiple signal paths of FIG. 3C in accordance with an embodiment of the present invention.

Referring now to FIG. 4, a timing diagram illustrating the operation of a signal path of the multiple signal paths of FIG. 3C in accordance with an embodiment of the present invention is shown. The signal path corresponds to the multi-cycle path constraint. In an example, the frequency of the third clock signal is 3.2 MHz. At time T1, the third clock signal ($V_{CLK\_3}$) is at logic high. The fourth, fifth, and sixth input signals are at logic high, logic high, and logic low, respectively. At time T2, the buffered second intermediate signal ($V_{BUF\_INT\_2}$) toggles from logic low to logic high. At time instance T3, the third clock signal ($V_{CLK\_3}$) toggles from logic high state to logic low. At time T4, the buffered third intermediate signal ($V_{BUF\_INT\_3}$) toggles from logic low to logic high. At time T5, the buffered second output signal ($V_{BUF\_OUT\_2}$) toggles from logic low to logic high. The transition of the buffered second output signal ($V_{BUF\_OUT\_2}$) lies in a setup and hold time window around a clock edge of the third clock signal ($V_{CLK\_3}$), thereby resulting in timing violations. Thus, the processor 104 identifies corresponding multi-cycle path constraint as invalid.

The netlist 112 generated by the processor 104 based on the RTL code 106 includes the first and second clock paths of FIG. 3A, the logic cell module 302, first mux 306, the second mux 308, the first clock delay cell 318, the first flip-flop 320, the second AND gate 324, the XOR gate 328, the second clock delay cell 332, and the second flip-flop 334. The netlist 112 does not include the seventh buffer cell 304, the eighth buffer cell 310, the ninth buffer cell 312, the tenth buffer cell 322, the eleventh buffer cell 326, the twelfth buffer cell 330, and the thirteenth buffer cell 336. The processor 104 modifies the netlist 112 by inserting the seventh buffer cell 304, the eighth buffer cell 310, the ninth buffer cell 312, the tenth buffer cell 322, the eleventh buffer cell 326, the twelfth buffer cell 330, and the thirteenth buffer cell 336 and generates the netlist 300.

In operation, the processor 104 receives the RTL code 106 from the memory 102 and generates corresponding netlist 112. The processor 104 identifies the first and second clock paths in the netlist 112 based on corresponding asynchronous clock constraint and inserts the seventh buffer cell 304 in the second clock path. The processor 104 identifies the false path in the netlist 112 based on corresponding false path constraint and inserts the eighth buffer cell 310 at the output terminal of the first mux 306. The processor 104 inserts the ninth buffer cell 312 at the output terminal of the second mux 308. The processor 104 identifies the multi-cycle path in the netlist 112 based on corresponding multi-cycle path constraint. The processor 104 inserts the tenth buffer cell 322 at the output terminal of the first flip-flop 320. The processor 104 inserts the eleventh buffer cell 326 at the output terminal of the second AND gate 324. The processor 104 inserts the twelfth buffer cell 330 at the output terminal of the XOR gate 328. The processor 104 inserts the thirteenth buffer cell 336 at the output terminal of the second flip-flop 334. Thus, the processor 104 modifies the netlist 112 and generates the netlist 300.

The processor 104 delay annotates the first mux 306, the second mux 308, the first clock delay cell 318, the first flip-flop 320, the second AND gate 324, the XOR gate 328, the second clock delay cell 332, and the second flip-flop 334 in the netlist 300 with the zero delay value. The processor 104 further delay annotates the interconnecting wires in the netlist 300 with the zero delay value. The processor 104 delay annotates the seventh buffer cell 304, the eighth buffer cell 310, the ninth buffer cell 312, the tenth buffer cell 322, the eleventh buffer cell 326, the twelfth buffer cell 330, and the thirteenth buffer cell 336 in the netlist 300 with corresponding delay values. Subsequently, the processor 104 generates the modeled SDF file 114. The modeled SDF file 114 includes information indicative of the asynchronous clock constraint, the false path constraint, and the multi-cycle path constraint. The modeled SDF file 114 further includes the delay values of the first mux 306, the second mux 308, the first clock delay cell 318, the first flip-flop 320, the second AND gate 324, the XOR gate 328, the second clock delay cell 332, the second flip-flop 334, and the interconnecting wires of the netlist 300. The modeled SDF file 114 further includes the delay values of the seventh buffer cell 304, the eighth buffer cell 310, the ninth buffer cell 312, the tenth buffer cell 322, the eleventh buffer cell 326, the twelfth buffer cell 330, and the thirteenth buffer cell 336 of the netlist 300. The processor 104 stores the modeled SDF file 114 in the memory 102.

The processor 104 performs the GLS based on the modeled SDF file 114. The processor 104 identifies the asynchronous clock constraint and the false path constraint as valid. If the processor 104 identifies the multi-cycle path constraint as invalid, the processor 104 updates the modeled SDF file 114. The updated SDF file (not shown) is then stored in the memory 102.

It will be understood by those skilled in the art that the processor 104 identifies all false paths, all clock paths, and all multi-cycle paths based on the timing constraints in the timing constraint file 108 for verifying the timing constraints. It will be understood by those skilled in the art that the processor 104 identifies missing constraints along with invalid timing constraints in the timing constraint file 108.

Thus, the processor 104 generates the modeled SDF file 114 based on the timing constraints. The processor 104 generates the modeled SDF file 114 such that the delay information of circuit elements such as the logic cells, the clock delay cells, and buffer cells include timing margins in the delay values of the circuit elements and interconnecting wires. The timing margins are indicative of variations in the delay values that are introduced due to on-chip variations. As the delay information includes timing margins, the time required for designing an IC based on the IC design is reduced, i.e., the design cycle time is reduced. Further, invalid and missing timing constraints are identified and the modeled SDF file 114 is updated.

The processor 104 includes timing margins in the delay values of the buffer cells inserted in the netlist 112 based on the estimated delay values of the signal paths. Therefore, it is not necessary to perform on-chip variation analysis. The processor 104 identifies the invalid timing constraints and missing timing constraints in the timing constraint file 108, thereby reducing the time required for verifying the IC design. As the processor 104 identifies invalid asynchronous clock constraints, identifying the presence of a synchronizer in the netlist 112 is not necessary, thereby further reducing the time of the IC design cycle.

Figure 5A:
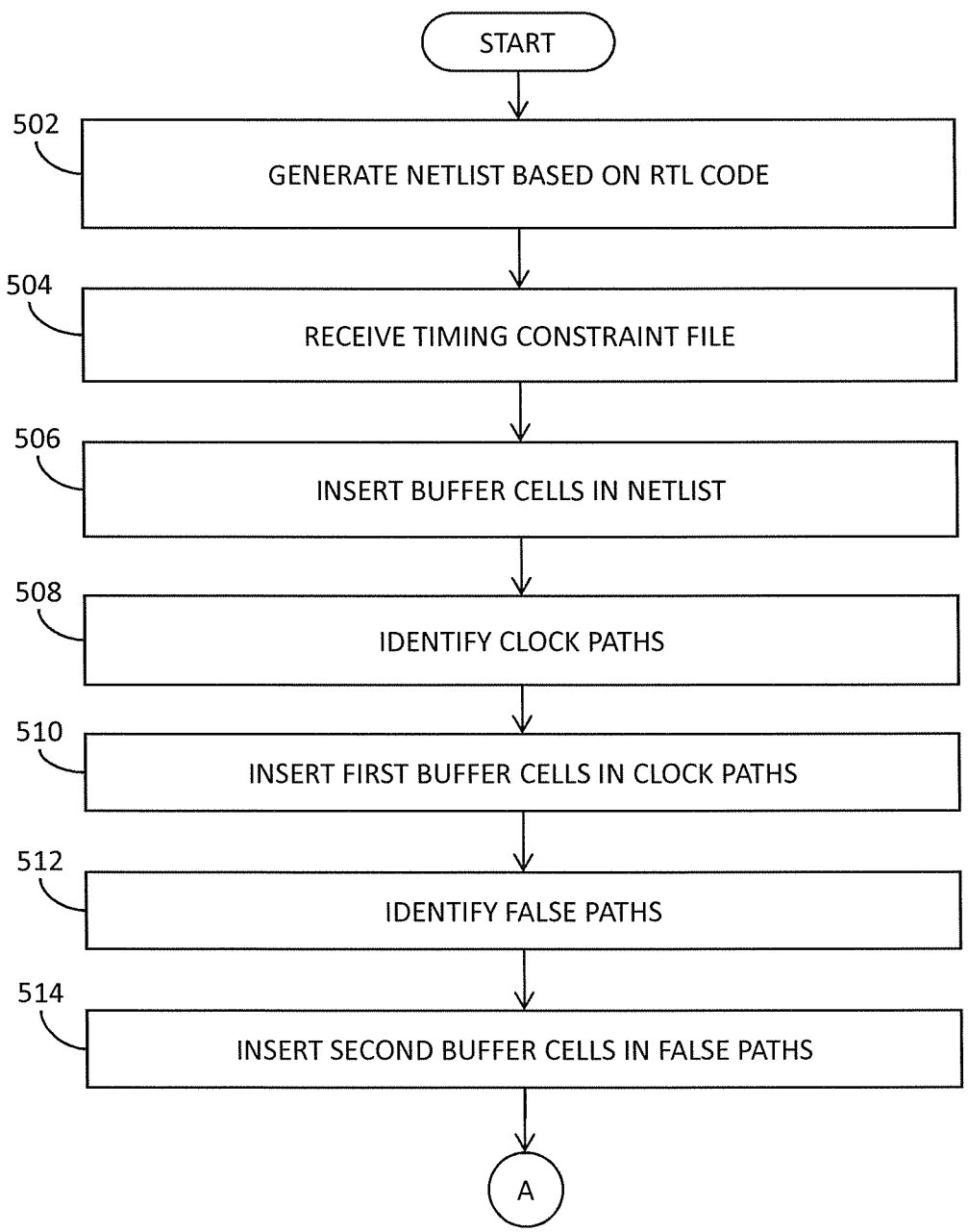
FIGS. 5A, 5B and 5C are a flow chart illustrating a method for verifying timing constraints of the netlist of FIG. 1 using the EDA tool of FIG. 1 in accordance with an embodiment of the present invention.
Figure 5B:
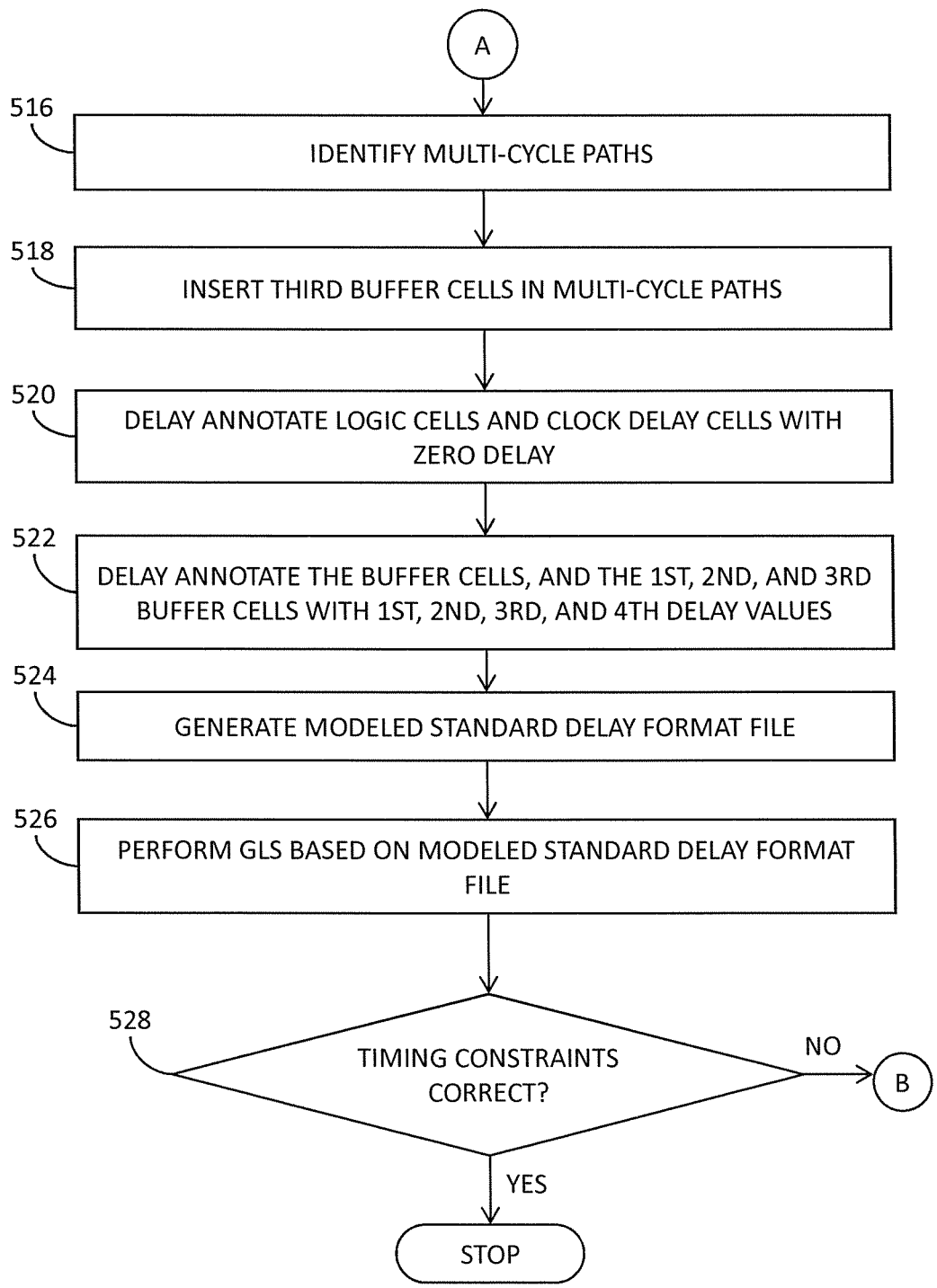
Figure 5C:
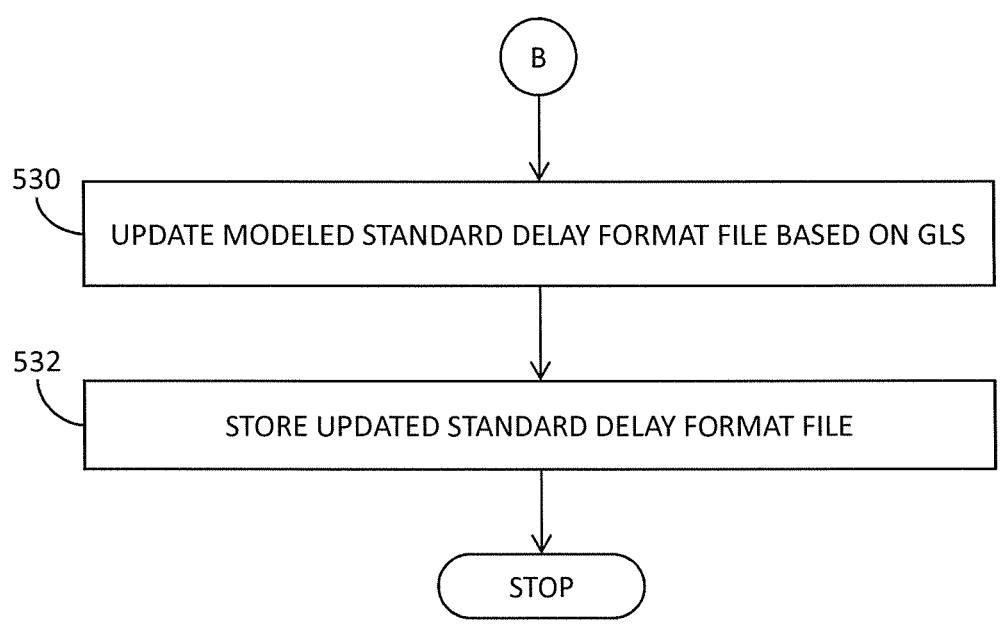

Referring now to FIG. 5, a flow chart illustrating a method for verifying the timing constraints of the netlist 112 that is indicative of the IC design using the EDA tool 100 in accordance with an embodiment of the present invention is shown. At step 502, the processor 104 generates the netlist 112 based on the RTL code 106 of the IC design. At step 504, the processor 104 receives the timing constraint file 108 from the memory 102. At step 506, the processor 104 inserts the plurality of buffer cells in the netlist 112. At step 508, the processor 104 identifies one or more clock paths in the netlist 112 based on the asynchronous clock constraint. At step 510, the processor 104 inserts the first buffer cell in the one or more clock paths. At step 512, the processor 104 identifies the false path in the netlist 112 based to the false path constraint. At step 514, the processor 104 inserts the second buffer cell in the false path. At step 516, the processor 104 identifies the multi-cycle path in the netlist 112 based on the multi-cycle path constraint. At step 518, the processor 104 inserts the third buffer cell in the multi-cycle path. At step 520, the processor 104 delay annotates the plurality of logic cells and the plurality of clock delay cells with the zero delay value. At step 522, the processor 104 delay annotates the plurality of buffer cells with corresponding delay values. The processor 104 further delay annotates the first, second, and third buffer cells with first, second, and third delay values. At step 524, the processor 104 generates the modeled SDF file 114. At step 526, the processor 104 performs the GLS based on the modeled SDF file 114. At step 528, the processor 104 checks to determine whether the timing constraints are correct based on the GLS. At step 528, if the processor 104 determines that the timing constraints are not correct, the processor 104 executes step 530. At step 530, the processor 104 updates the modeled SDF file 114. At step 532, the processor 104 stores an updated SDF file in the memory 102.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

No element, act, or instruction used in the present application should be construed as critical or essential to the invention unless explicitly described as such. Further, the phrase "based on" is intended to mean "based, at least in part, on" unless explicitly stated otherwise. The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. It should be understood that, although the terms first, second, etc. and horizontal and vertical are used to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for verifying timing constraints of a netlist, wherein the netlist is indicative of an integrated circuit (IC) design, the EDA tool comprising:

a memory for storing a register transfer level (RTL) code of the IC design and a timing constraint file, wherein the timing constraint file includes asynchronous clock, false path, and multi-cycle path constraints; and a processor in communication with the memory, wherein the processor is configured for:

generating the netlist based on the RTL code, wherein the netlist includes a plurality of logic cells and a plurality of clock delay cells that form a plurality of clock paths, a plurality of false paths, and a plurality of multi-cycle paths;

reading the timing constraint file stored in the memory;

inserting a plurality of buffer cells into the netlist, including inserting at least one first buffer cell for each logic cell of the plurality of logic cells in the netlist, wherein the at least one first buffer cell and its corresponding logic cell form a two-stage logic cell;

identifying at least one clock path of the plurality of clock paths based on the asynchronous clock constraints;

inserting at least one second buffer cell into the at least one clock path;

identifying at least one false path of the plurality of false paths based on the false path constraints;

inserting at least one third buffer cell into the at least one false path;

identifying at least one multi-cycle path of the plurality of multi-cycle paths based on the multi-cycle path constraints;

inserting at least one fourth buffer cell into the at least one multi-cycle path;

delay annotating the plurality of logic cells and the plurality of clock delay cells with a zero delay value;

delay annotating the at least one first, second, third, and fourth buffer cells with first, second, third, and fourth delay values, respectively;

generating a modeled standard delay format (SDF) file;

storing the modeled SDF file in the memory; and performing a gate level simulation (GLS) based on the modeled SDF file for verifying the asynchronous clock, false path, and multi-cycle path constraints.

2. The EDA tool of claim 1, wherein the processor is further configured for:

updating the modeled SDF file based on the GLS; and storing an updated SDF file in the memory.

3. The EDA tool of claim 1, wherein the processor inserts the at least one first buffer cell at an output terminal of the corresponding logic cell of the plurality of logic cells.

4. The EDA tool of claim 1, wherein the processor inserts the at least one first buffer cell at an input terminal of the corresponding logic cell of the plurality of logic cells.

5. The EDA tool of claim 1, wherein the second delay value is substantially equal to a time period of a first design frequency of the IC design.

6. The EDA tool of claim 1, wherein the third delay value is substantially equal to a time period of a second design frequency of the IC design.

7. The EDA tool of claim 6, wherein the second design frequency is a lowest design frequency of the IC design.

8. The EDA tool of claim 1, wherein the fourth delay value is substantially equal to a time period of a third design frequency of the IC design.

9. A method for verifying timing constraints of a netlist by using an electronic design automation (EDA) tool, wherein the netlist is indicative of an integrated circuit design, and wherein the EDA tool includes a memory and a processor in communication with the memory, and wherein the memory stores a register transfer level (RTL) code of the integrated circuit design and a timing constraint file, and wherein the timing constraint file includes asynchronous clock, false path, and multi-cycle path constraints, the method comprising:

generating the netlist based on the RTL code, wherein the netlist includes a plurality of logic cells and a plurality of clock delay cells that form a plurality of clock paths, a plurality of false paths, and a plurality of multi-cycle paths;

reading the timing constraint stored in the memory;

inserting a plurality of buffer cells into the netlist, wherein the processor inserts at least one first buffer cell of the plurality of buffer cells for each logic cell of the plurality of logic cells in the netlist, thereby forming a plurality of two-stage logic cells formed by the at least one first buffer cell and its corresponding logic cell;

identifying at least one clock path of the plurality of clock paths based on the asynchronous clock constraints;

inserting at least one second buffer cell into the at least one clock path;

identifying at least one false path of the plurality of false paths based on the false path constraints;

inserting at least one third buffer cell into the at least one false path;

identifying at least one multi-cycle path of the plurality of multi-cycle paths based on the multi-cycle path constraints;

inserting at least one fourth buffer cell into the at least one multi-cycle path;

delay annotating the plurality of logic cells and the plurality of clock delay cells with a zero delay value;

delay annotating the at least one first, second, third, and fourth buffer cells with first, second, third, and fourth delay values, respectively;

generating a modeled standard delay format (SDF) file;

storing the modeled SDF file in the memory; and performing a gate level simulation (GLS) based on the modeled SDF file for verifying the asynchronous clock, false path, and multi-cycle path constraints.

10. The method of claim 9, further comprising:
updating the modeled SDF file based on the GLS; and
storing an updated SDF file in the memory.

11. The method of claim 9, wherein the at least one first buffer cell is inserted at an output terminal of a corresponding logic cell of the plurality of logic cells.

12. The method of claim 9, wherein the at least one first buffer cell is inserted at an input terminal of a corresponding logic cell of the plurality of logic cells.

13. The method of claim 9, wherein the second delay value is substantially equal to a time period corresponding to a first design frequency of the IC design.

14. The method of claim 9, wherein the third delay value is substantially equal to a time period corresponding to a second design frequency of the IC design.

15. The method of claim 14, wherein the second design frequency is the lowest design frequency of the IC design.

16. The method of claim 9, wherein the fourth delay value is substantially equal to a time period corresponding to a third design frequency of the IC design.

17. A method for verifying timing constraints of a netlist by using an electronic design automation (EDA) tool, wherein the netlist is indicative of an integrated circuit (IC) design, wherein the EDA tool includes a memory and a processor in communication with the memory, wherein the memory stores a register transfer level (RTL) code of the IC design and a timing constraint file, and wherein the timing constraint file includes asynchronous clock, false path, and multi-cycle path constraints, the method comprising:

generating the netlist based on the RTL code, wherein the netlist includes a plurality of logic cells and a plurality of clock delay cells that form a plurality of clock paths, a plurality of false paths, and a plurality of multi-cycle paths;

receiving the timing constraint file from the memory;

inserting a plurality of buffer cells into the netlist, including inserting at least one first buffer cell of the plurality of buffer cells for each logic cell of the plurality of logic cells in the netlist, wherein the at least one first buffer cell and its corresponding logic cell form a two-stage logic cell;

identifying at least one clock path of the plurality of clock paths based on the asynchronous clock constraints;

inserting at least one second buffer cell into the at least one identified clock path;

identifying at least one false path of the plurality of false paths based on the false path constraints;

inserting at least one third buffer cell into the at least one identified false path;

identifying at least one multi-cycle path of the plurality of multi-cycle paths based on the multi-cycle path constraints;

inserting at least one fourth buffer cell into the at least one identified multi-cycle path;

delay annotating the plurality of logic cells and the plurality of clock delay cells with a zero delay value;

delay annotating the at least one first, second, third, and fourth buffer cells with respective first, second, third, and fourth delay values, wherein the second delay value is substantially equal to a time period of a first design frequency of the IC design, the third delay value is substantially equal to a time period of a second design frequency of the IC design, and the fourth delay value is substantially equal to a time period of a third design frequency of the IC design;

generating a modeled standard delay format (SDF) file;
performing a gate level simulation (GLS) based on the modeled SDF file for verifying the asynchronous clock, false path, and multi-cycle path constraints;
updating the modeled SDF file based on the GLS; and
storing an updated SDF file in the memory.

18. The method of claim 17, wherein the at least one first buffer cell is inserted at an output terminal of a corresponding logic cell of the plurality of logic cells.

19. The method of claim 17, wherein the at least one first buffer cell is inserted at an input terminal of a corresponding logic cell of the plurality of logic cells.

20. The method of claim 17, wherein the second design frequency is the lowest design frequency of the IC design.

* * * * *